Figure 1:
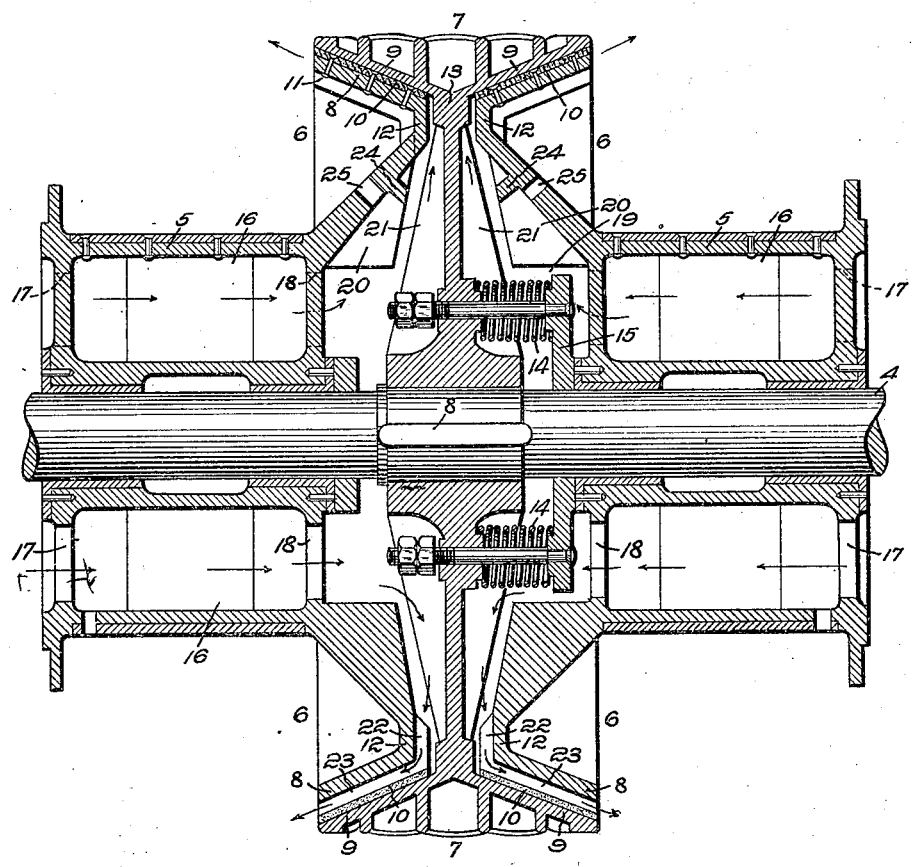

May 29, 1928.

A. E. NORRIS 1,671,443

CLUTCH

Filed Nov. 29, 1924

2 Sheets-Sheet 1

Inventor:
Almon E. Norris,
by Emery, Booth, Janney & Varney
Attys.

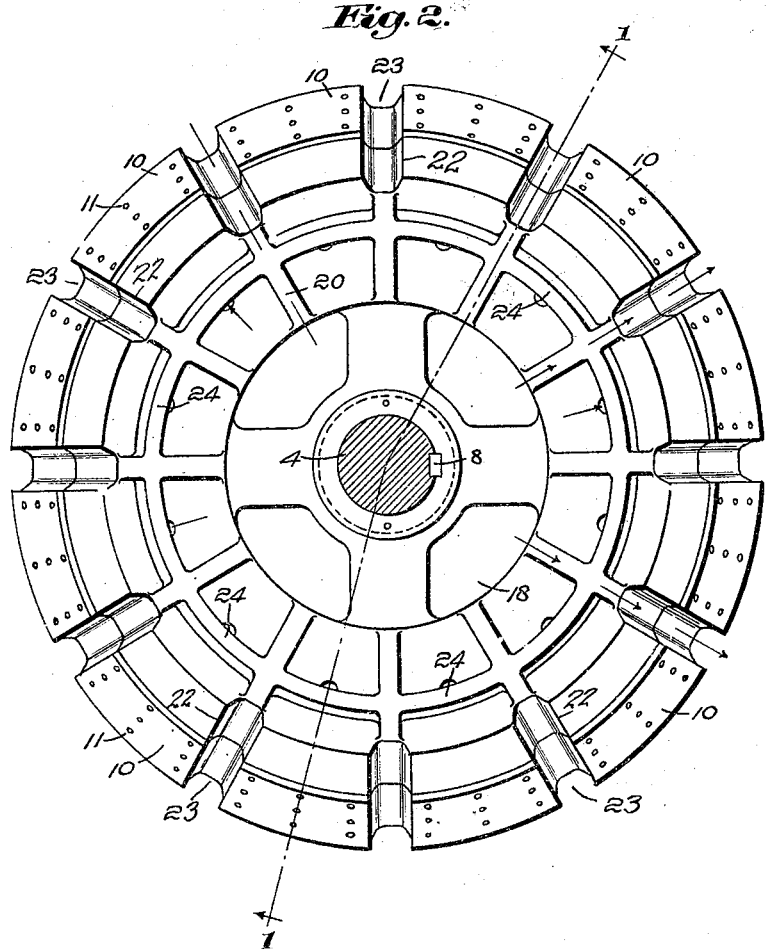

Patented May 29, 1928.

1,671,443

UNITED STATES PATENT OFFICE.

ALMON E. NORRIS, OF BROOKLINE, MASSACHUSETTS.

CLUTCH.

Application filed November 29, 1924. Serial No. 752,862.

This invention relates to a friction clutch having novel means for cooling the frictionally engaging surfaces by which the power is transmitted.

The invention will be best understood by reference to the following description, when taken in connection with the accompanying drawings of one specific embodiment thereof, while its scope will be more particularly pointed out in the appended claim.

In the drawings:

Fig. 1 is a central, longitudinal section of a clutch exemplifying the invention, on line 1—1 of Fig. 2; and Fig. 2 is an elevation of one of the clutch members, as viewed from the rear end thereof.

Referring to the drawings, and to the embodiment of the invention which is selected for exemplification, there is shown a clutch mechanism comprising a shaft 4, on which two rope-winding drums 5 are loosely mounted for independent rotation, and are free to slide lengthwise. Carried by each of these drums is a clutch member 6, each of which cooperates with an intermediate clutch member 7, the latter being suitably secured to and held against rotation on the shaft, as by a key 8. In the present example, I have shown two oppositely facing cone clutches, each comprising inner and outer cones 8 and 9. The inner cone is provided with any usual or suitable lining or facing 10, secured thereto as by rivets 11. Each of the cones is supported at its inner end only, and is in the form of a flange. In the case of the cone 8, the flange is supported by a web 12, while the flange 9 is supported by a web 13.

The clutch members may be engaged and disengaged by any usual or suitable mechanism, such as that disclosed in United States Letters Patent No. 1,247,564, issued to me November 20th, 1917. In Fig. 1 of the drawings, I have shown simply the means for releasing or disengaging the clutch members, comprising pairs of springs 14 interposed between the web 13 and a yoke 15, having endwise engagement with the inner end of the corresponding drum.

Clutches of this character are used in connection with hoisting operations for raising and lowering loads, and the friction surfaces are utilized as a clutch for hoisting, and as a brake for lowering. The service to which they are subjected is severe, especially as there is a very considerable slippage of the engaging surfaces over extended periods, as in the case of lowering a load a great distance. The cooling of the friction surfaces is therefore a matter of great importance. Herein, the cooling is accomplished more thoroughly than has been possible heretofore by the use of the cooling means which will now be described, reference being had at first to Fig. 1.

Each of the drums is provided with a chamber having at its outer end one or more inlets 17, through which air is taken, the air then passing through openings 18 to a chamber 19 within the clutch, where provision is made to cause it to be expelled by the action of centrifugal force by the use of blades or ribs 20 carried by the clutch member 6, and blades or ribs 21 carried by the clutch member 7. These ribs whirl the air around within the chamber 19, and centrifugal force induces a flow of air which is conducted from the chamber 19 through passages 22 and 23, shown at the lower portion of Fig. 1, leading first in a radial direction outward along the confronting faces of the webs 12, and then longitudinally of the clutch axis in and along the flange 8. The clutch facing is interrupted at these points (see Fig. 2), and the air is brought into direct contact with the friction surfaces of the outer clutch member, and is discharged at the outer end of the passages 22 and 23, the flow of the air being indicated by arrows in Figs. 1 and 2. In this way, a most thorough cooling action is assured, with the result that the clutch may be subjected to severe service without undue heat.

Surplus oil thrown out by centrifugal force lodges against a circumferential rib 24, shown in elevation in Fig. 2, and in section in the upper portion of Fig. 1, and the oil which is thus deflected passes out through openings 25, thus minimizing the danger of oil reaching the friction surfaces.

Having thus described one embodiment of the invention, but without limiting myself thereto, what I claim and desire by Letters Patent to secure is:

In a friction clutch, the combination of cooperating clutch members presenting a chamber having an inlet, said members each having a web and a frusto-conical flange, one of said members presenting a plurality of outlet passages leading from said chamber in outward directions along its web and thence along its frusto-conical flange, the member which presents said passages being provided with facings secured to its frusto-conical flange to afford separate friction surfaces between said passages, and means carried by said webs to whirl the air around within said chamber and thereby to utilize centrifugal force to induce a flow of air from said inlet through said chamber, thence through said passages first in outward directions along and between said webs and finally along and between said flanges and between adjacent ends of said facings.

In testimony whereof, I have signed my name to this specification.

ALMON E. NORRIS.